June 3, 1941. C. D. BONSALL Re. 21,816

INSULATED CAR WALL

Original Filed June 12, 1937

Inventor:-
Charles D. Bonsall,
By Dutton & Ellison
Atty

Reissued June 3, 1941

Re. 21,816

UNITED STATES PATENT OFFICE 21,816

INSULATED CAR WALL

Charles D. Bonsall, Chicago, Ill., assignor, by mesne assignments, to Standard Railway Equipment Manufacturing Company, a corporation of Delaware Original No. 2,117,397, dated May 17, 1938, Serial No. 147,969, June 12, 1937. Application for reissue May 13, 1940, Serial No. 334,985

19 Claims. (Cl. 189—34)

The invention relates to a wall which is insulated to prevent or retard transfer of heat through it from one side to the other and is especially adaptable for use in a wall, roof, floor or door for a refrigerator car or truck which is used to transport perishable commodities.

One of the objects of the invention is to provide a wall of spaced apart sheets, one or both of which is metallic, with stiffeners connecting such sheets so that the sheets will cooperate to form a very strong structure to resist stresses against either side of the wall and to provide an insulating wall by putting insulating material between the sheets, and as the insulating materials now in general use are combustible, another object of the invention is to provide stiffeners of such construction that a sheet may be welded to them without igniting the insulating material.

A still further object is to provide means to insulate the stiffeners so that heat will not be conducted by them through the wall.

Another object is to associate and arrange such insulating means so that it cooperates with the elements forming the stiffeners to provide hollow spaces to prevent the heat of welding from igniting the insulating material between the sheets, and a further object is to insulate that portion of the wall occupied by the hollow spaces by filling such spaces with non-combustible insulating material.

Another object is to provide a waterproof structure by connecting the associated parts of the wall together so as to prevent moisture from contacting the insulating material and reducing its insulating efficiency.

Another object is to provide a metallic sheet wall having a smooth interior or exterior surface (or both if desired) made out of flat metallic sheets.

Figure 1:
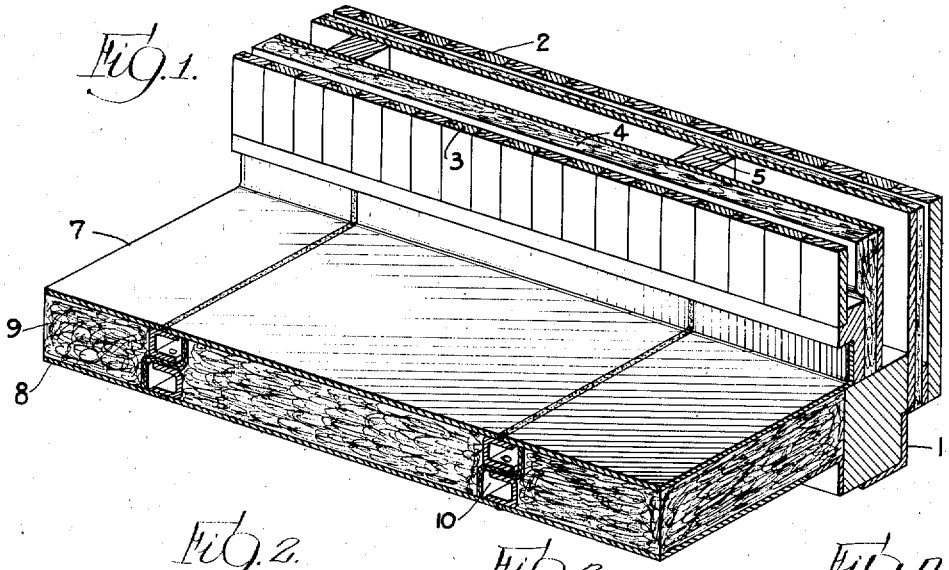
Fig. 1 shows a typical application of my improved wall used as the floor of a railway refrigerator car.

Figs. 3–8 inclusive show modified forms of stiffeners which may be used between metallic sheets to accomplish the objects of the invention.

The drawing shows the usual parts of the car, such as side sill 1; side wall sheathing 2; side wall lining 3; side wall insulation 4 and side wall framing 5.

Figure 2:
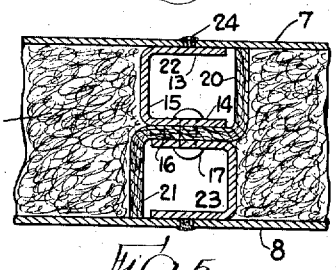
Fig. 2 shows an enlarged cross section of the metallic sheets and stiffener shown in Fig. 1.

The form of my wall or floor shown in Figs. 1 and 2 comprises an upper metallic sheet 7 and a lower metallic sheet 8 spaced therefrom and substantially parallel thereto, insulating material 9 between said sheets and an insulated stiffener 10 connecting the sheets. The stiffener comprises two metallic members, each of said members comprising an outer flange 13, an inner flange 14 and a web 15 connecting the flanges. The insulating fabric or other insulating material 16 is positioned between the inner flanges 14 of the two members and is preferably secured thereto by the rivet 17. The insulating fabric is formed with flanges 20 and 21, which flanges cooperate with the webs 15 of the members to provide hollow spaces 22 and 23. The metallic sheets 7 and 8 are secured to the metallic members, and one or both of the sheets 7—8 being welded to the outer flanges 13; the spaces 22 and 23 preventing the heat of the welding from igniting the insulating material 9. When two upper sheets 7—7 or two lower sheets 8—8 or two upper sheets and two lower sheets are used, they may be joined by the welding material 24 which secures both of said sheets to the outer flange 13 of the member.

The insulating fabric 16 is made of some porous material which may be moulded in any desired shape, usually when wet, but which has sufficient stiffness, when dry, to maintain its form. A piece of any material having insulating qualities and rigidity adequate to function in the manner disclosed may be used in place of the fabric.

If desired the spaces 22 and 23 may be filled with some non-combustible material, such as asbestos.

Figure 3:
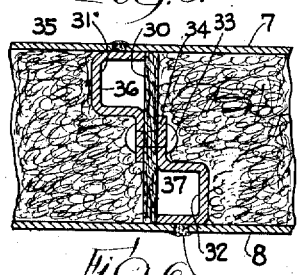

In the modification shown in Fig. 3 a fabric 30 is made of one flat piece of material extending between the upper 7 and lower 8 metallic sheets and the members 31—32 are secured on opposite sides of the fabric, preferably by the rivet 33. Each member is provided with an inner flange 34, an outer flange 35 and a web 36 to form the space 37. The metallic sheets 7—8 are secured to the members 31—32, one or both of the sheets 7—8 being secured by welding (37) to the outer flanges 35.

Figure 4:
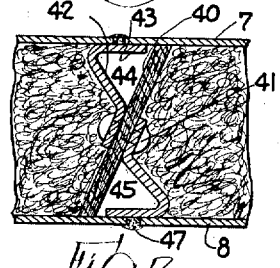

In the modification shown in Fig. 4 the fabric 40 is one flat piece of material extending diagonally between the upper 7 and lower 8 metallic sheets. The metallic members are positioned on opposite sides of the fabric and secured thereto and to each other, preferably by the rivet 41, and each member is provided with a web 42 and flange 43 to cooperate with the fabric to form the spaces 44 and 45. The upper and lower sheets are secured to the metallic members, one or both of the sheets being secured by welding (47) to the outer flanges 43.

Fig. 4 is an improvement over Fig. 3 because the welds are in line with each other.

Figure 5:
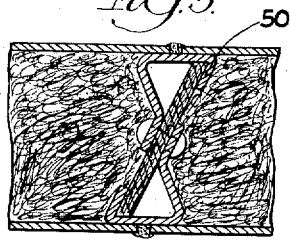

Fig. 5 is a modification of the construction shown in Fig. 4 wherein the members are provided with lips 50 which overlap the fabric to hold it in place.

Figure 6:
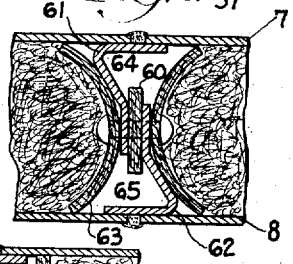

Fig. 6 shows a modification wherein a short piece of fabric 60 is positioned between the two metallic members 61—62 to provide an insulation therebetween and other pieces of fabric 63 are positioned on opposite sides of the stiffener which extend between and preferably contact both the upper 7 and lower 8 metallic sheets. The metallic members are formed so as to cooperate with one of the pieces of fabric to form the spaces 64 and 65.

Figure 7:
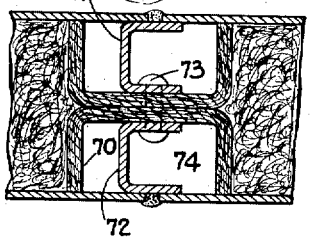

Fig. 7 shows a modification wherein two channel shape pieces 70 of fabric are positioned between the upper 71 and lower 72 metallic members and preferably secured thereto by the rivet 73. These channel shape pieces of fabric 70 form air spaces 74, one or both of which are contiguous to welding to prevent heat of such welding from igniting the insulating material 9.

Figure 8:
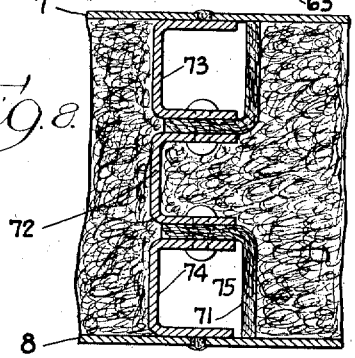

Fig. 8 shows a modification wherein a stiffener is used in a wall wherein the metallic sheets 7—8 are spaced relatively far apart, in which case it may not be necessary for the fabric 71 to extend all the way between the two metallic sheets, so I provide an intermediate metallic member 72 between the upper 73 and lower 74 metallic members and the fabric 71 is formed so that it cooperates with a part of the metallic member to provide the space 75.

In all of the above described structures each of the metallic members is provided with a part to which the adjacent metallic sheet is welded and fabric is positioned between the two (or more) metallic members so that there is no direct conduit for heat from one side of the wall to the other. Some of the structures show the fabric formed to cooperate with a part of one of the metallic members to provide a space so that the heat of welding will not ignite the combustible insulation between the sheets and others of the structures show a piece or pieces of fabric arranged to cooperate solely with one of the sheets 7—8 to form a space contiguous to the weld to prevent heat of the welding from igniting the insulating material 9. In the above described constructions the metallic members and the fabric are associated so that they will transmit a direct load from one sheet to the other either in tension or compression, therefore, the stiffeners cause the sheets to become compression and tension members of a beam to resist stresses imposed on the wall from one side or the other thereof.

The accompanying drawing illustrates the preferred form of the invention, though it is to be understood that the invention is not limited to the exact details of construction shown and described, as it is obvious that various modifications thereof, within the scope of the claims, will occur to persons skilled in the art.

I claim:

1. An insulating wall comprising spaced apart metallic sheets, combustible insulating material between said sheets and an insulated stiffener connecting said sheets, said stiffener comprising a metallic member welded to each sheet and an insulating fabric interposed between said members, and having parts disposed in spaced relation to portions of said members to form walls at least partially encasing hollow spaces positioned adjacent the welds, thereby preventing the heat of welding from igniting said combustible insulation.

2. An insulating wall comprising spaced apart metallic sheets, combustible insulating material between said sheets and an insulated stiffener connecting said sheets, said stiffener comprising a metallic member welded to each sheet and an insulating fabric interposed between said members and secured thereto, said fabric having parts disposed in spaced relation to portions of said members to form walls at least partially encasing hollow spaces positioned adjacent the welds, thereby preventing the heat of welding from igniting said combustible insulation.

3. An insulating wall comprising spaced apart metallic sheets, combustible insulating material between said sheets and an insulated stiffener connecting said sheets, said stiffener comprising two channel shaped metallic members each having one flange thereof welded to one of said sheets, and an insulating fabric between the other flanges of said members, said insulating fabric having portions which cooperate with the webs of said members to provide hollow spaces to prevent the heat of welding from igniting the combustible insulation.

4. An insulating wall comprising spaced apart metallic sheets, combustible insulating material between said sheets and an insulated stiffener connecting said sheets, said stiffener comprising two channel shaped metallic members each having one flange thereof welded to one of said sheets, and an insulating fabric between the other flanges of said members, said insulating fabric having portions which cooperate with the webs of said members to provide hollow spaces to prevent the heat of welding from igniting the combustible insulation, and means to secure the last mentioned flanges and the fabric together.

5. An insulating wall comprising spaced apart metallic sheets, combustible insulating material between said sheets and an insulated stiffener connecting said sheets, said stiffener comprising a metallic member welded to each sheet, an insulating fabric interposed between said members. and having parts disposed in spaced relation to portions of said members to form walls at least partially encasing hollow spaces positioned adjacent the welds, thereby preventing the heat of welding from igniting said combustible insulation and non-combustible insulation in said hollow channels.

6. An insulating wall comprising spaced apart metallic sheets, combustible insulating material between said sheets and an insulated stiffener connecting said sheets, said stiffener comprising a metallic member welded to each sheet, and an insulating fabric between said members, said fabric having spaced parts disposed on opposite sides of and spaced from portions of said members to form walls at least partially encasing hollow spaces positioned on both sides of said members to prevent the heat of welding from igniting said combustible insulation.

7. An insulating wall comprising spaced apart metallic sheets, combustible insulating material between said sheets and an insulated stiffener connecting said sheets, said stiffener comprising a piece of stiff insulating fabric extending between said sheets, a metallic member on each side of said fabric, and means to secure both of said members to said fabric, each of said members having a flat part to which the adjacent metallic sheet is welded and a portion spaced from a part of the fabric to form walls at least partially encasing hollow spaces positioned adjacent the welds to prevent the heat of welding from igniting the insulation.

8. An insulating wall comprising spaced apart metallic sheets, combustible insulating material between said sheets and an insulated stiffener connecting said sheets, said stiffener comprising a piece of stiff insulating fabric extending between said sheets, a metallic member on each side of said fabric, and means to secure both of said members to said fabric, each of said members having a flat part to which the adjacent metallic sheet is welded and a portion spaced from a part of the fabric to form walls at least partially encasing hollow spaces positioned adjacent the welds to prevent the heat of welding from igniting the insulation, each of said members provided with a lip to hold the fabric in place.

9. An insulated wall comprising spaced apart metallic sheets, insulating material between said sheets and an insulating stiffener connecting said sheets, said stiffener comprising a member secured to one of said sheets, a metallic member welded to the other of said sheets, and an insulating piece interposed between said members and having a part spaced from a portion of said metallic member to form walls at least partially encasing an air space contiguous to the weld to prevent heat of the welding from igniting said insulating material.

10. An insulated wall comprising a sheet, a pair of substantially coplanar metallic sheets in spaced relation to the first mentioned sheet to form a space therebetween, insulating material in said space and an insulating stiffener in said space comprising a member secured to the first mentioned sheet, a metallic member, and an insulating piece interposed between said members, said coplanar sheets being welded to said metallic member, said insulating piece having a part spaced from a portion of said metallic member to form walls at least partially encasing an air space contiguous to the welding to prevent heat of the welding from igniting said insulating material.

11. An insulated wall comprising a sheet, a pair of substantially coplanar metallic sheets in spaced relation to the first mentioned sheet to form a space therebetween, insulating material in said space and an insulating stiffener in said space comprising a member secured to the first mentioned sheet, a metallic member, and an insulating piece interposed between said members, said coplanar sheets being welded to a portion of said metallic member, said insulating piece having a concave part at least partially encasing said metallic member and disposed in spaced relation to said portion to prevent heat of the welding from igniting said insulating material.

12. An insulated wall comprising a sheet, a metallic sheet disposed in spaced relation to the first mentioned sheet, insulating material between said sheets, a stiffener secured to said first mentioned sheet and extending substantially to said metallic sheet, said stiffener including an insulating piece having a depressed part disposed in spaced relation to a portion of said metallic sheet to form walls substantially enclosing an air space, a metallic member disposed within said air space and forming a part of said stiffener, and means to weld said metallic sheet to said metallic member.

13. An insulated wall comprising a sheet, a metallic sheet disposed in spaced relation to the first mentioned sheet, insulating material between said sheets, a stiffener secured to said first mentioned sheet and extending substantially to said metallic sheet, said stiffener including insulating means to retard flow of heat through the stiffener from one to the other of said sheets, said means having a depressed part spaced from a portion of said metallic sheet to form walls at least partially encasing an air space, a metallic member disposed within said air space and forming a part of said stiffener, and means to weld said metallic sheet to said metallic member.

14. An insulated wall comprising a sheet, a metallic sheet disposed in spaced relation to the first mentioned sheet, insulating material between said sheets and an insulating stiffener in said space comprising a member secured to the first mentioned sheet, a metallic member and an insulating piece interposed between said members, said metallic sheet being welded to said metallic member, said insulating piece having a concave part which forms a wall at least partially enclosing a space encasing said metallic member to prevent heat of the welding from igniting said insulating material.

15. An insulated wall comprising a sheet, a pair of substantially coplanar metallic sheets disposed in spaced relation to the first mentioned sheet to form a space therebetween, insulating material in said space, a stiffener disposed in said space and secured to the first mentioned sheet, means to secure said metallic sheets to said stiffener, and means to retard flow of heat through said stiffener between said sheet and said metallic sheets, said insulating means having a part spaced from the adjacent marginal portions of said metallic sheets to form walls at least partially encasing an air space, said adjacent edges being welded together, whereby the air space protects the insulating material from the heat of welding.

16. An insulated wall comprising a sheet, a metallic sheet spaced therefrom, insulating material between said sheets and an insulating stiffener connecting said sheets, said stiffener comprising a member secured to said first mentioned sheet, a metallic member having a portion thereof welded to said metallic sheet, and means to retard heat transfer between said members, said means having a part spaced from said portion and forming a wall structure which at least partially encases a space positioned adjacent to the weld to prevent heat of the welding from igniting said insulating material.

17. An insulated wall comprising a sheet, a metallic sheet disposed in spaced relation to the first mentioned sheet to form a space therebetween, insulating material in said space, and a stiffener disposed in said space and secured to said first mentioned sheet, said stiffener including a metallic member and means to retard heat transfer between said metallic member and said first mentioned sheet, said metallic sheets being welded to said metallic member, said means having a part spaced from the weld to form a wall structure at least partially encasing an air space contiguous to the welding to protect said insulating material from the heat of welding.

18. An insulated wall comprising a sheet, a pair of substantially coplanar metallic sheets disposed in spaced relation to the first mentioned sheet to form a space therebetween, insulating material in said space, and a stiffener disposed in said space and secured to said first mentioned sheet, said stiffener including a metallic member and means to retard heat transfer between said metallic member and said first mentioned sheet, said metallic sheets being welded to said metallic member, said means having a part spaced from the weld to form a wall structure at least partially encasing an air space contiguous to the welding to protect the insulating material from the heat of welding.

19. An insulated wall comprising a sheet, a metallic sheet disposed in spaced relation to the first mentioned sheet to form a space therebetween, insulating material in said space, and a stiffener disposed in said space and secured to said first mentioned sheet, said stiffener including a metallic member, said metallic sheet being welded to said metallic member, said stiffener also including insulating means interposed between said sheet and said metallic sheet and having a part spaced from the weld to form a wall at least partially encasing an air space contiguous to the welding, thereby preventing heat of the welding from igniting said insulating material.

CHARLES D. BONSALL.